(12) United States Patent
Gray et al.

(10) Patent No.: US 10,922,231 B1
(45) Date of Patent: Feb. 16, 2021

(54) SYSTEMS AND METHODS THAT PREDICTIVELY READ AHEAD DIFFERENT AMOUNTS OF DATA FOR DIFFERENT CONTENT STORED IN A MULTI-CLIENT STORAGE SYSTEM

(71) Applicant: Open Drives LLC, Culver City, CA (US)

(72) Inventors: Scot Gray, Culver City, CA (US); Sean Lee, Culver City, CA (US)

(73) Assignee: Open Drives LLC, Culver City, CA (US)

( * ) Notice: Subject to any disclaimer, the term of this patent is extended or adjusted under 35 U.S.C. 154(b) by 0 days.

(21) Appl. No.: 17/078,009

(22) Filed: Oct. 22, 2020

(51) Int. Cl.
*G06F 12/0862* (2016.01)

(52) U.S. Cl.
CPC .. *G06F 12/0862* (2013.01); *G06F 2212/1024* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 9,921,839 B1 * | 3/2018 | Subramanian | G06F 9/3009 |
| 2005/0114605 A1 * | 5/2005 | Iyer | G06F 12/0888 711/133 |
| 2017/0039144 A1 * | 2/2017 | Wang | G06F 12/0875 |
| 2017/0083474 A1 * | 3/2017 | Meswani | G06F 12/0862 |
| 2018/0253381 A1 * | 9/2018 | Cook | G06F 16/00 |
| 2020/0004684 A1 * | 1/2020 | Heirman | G06F 12/0862 |

* cited by examiner

*Primary Examiner* — William E. Baughman
(74) *Attorney, Agent, or Firm* — Ansari Katiraei LLP; Arman Katiraei; Sadiq Ansari (57) ABSTRACT

Provided is a predictive read ahead system for dynamically prefetching content from different storage devices. The dynamic prefetching may include receiving requests to read a first set of data of first content from a first storage device at a first rate, and requests to read a first set of data of second content from a second storage device at a different second rate. The dynamic prefetching may include determining different performance for the first storage device than the second storage device, prioritizing an allocation of cache based on a first difference between the first rate and the second rate, and a second difference based on the different performance between the storage devices, and prefetching a first amount of the first content data from the first storage device and a different second amount of the second content data from the second storage device based on the first and second differences.

20 Claims, 9 Drawing Sheets

SYSTEMS AND METHODS THAT PREDICTIVELY READ AHEAD DIFFERENT AMOUNTS OF DATA FOR DIFFERENT CONTENT STORED IN A MULTI-CLIENT STORAGE SYSTEM

BACKGROUND

One of the most significant bottlenecks in computer performance is storage performance. Storage performance is especially problematic in a multi-client storage system in which multiple client devices attempt to read and write data to the same set of storage devices. The amount of reading and writing requested by the multiple client devices may surpass the storage performance of the set of storage devices, thereby creating performance bottlenecks that degrade the overall performance of the multi-client storage system.

DETAILED DESCRIPTION OF PREFERRED EMBODIMENTS

The following detailed description refers to the accompanying drawings. The same reference numbers in different drawings may identify the same or similar elements.

Provided are systems and methods that predictively read ahead different amounts of data for different content stored in a multi-client storage system. The predictive read ahead systems and methods may include dynamically determining different amounts of data to prefetch and cache from different content based on the content request rate, storage device performance, cache availability, and/or other factors. The predictive read ahead systems and methods may further include performing an out-of-order prefetching for retrieving data according to the non-sequential storage of that data on a storage device of the multi-client storage system. The predictive read ahead systems and methods may further include eliminating cache eviction overhead to increase storage performance of the multi-client storage system relative conventional data prefetching.

Conventional data prefetching may include retrieving data for particular content before that data is requested based on the rate at which earlier portions of the particular content are requested, and/or based on the popularity of the particular content. This approach may minimize the prefetching benefits when first content that is stored on faster performing storage devices (e.g., NonVolatile Memory express ("NVMe") storage devices or Solid-State Drive ("SSD") storage devices) is cached instead of second content that is stored on slower performance storage devices (e.g., mechanical disk storage devices). The predictive read ahead systems and methods may improve upon conventional data prefetching by dynamically prefetching content based on the content request rates as well as the performance of the individual storage devices in the multi-client storage system.

In some embodiments, conditioning the prefetching to account for differences in individual storage device performance may result in a desired disproportionate allocation of the prefetch cache to slower storage devices of the multi-client storage system that benefit the most from the data prefetching. In other words, the prefetch cache may be unevenly used to boost the performance of the slowest storage devices in the multi-client storage system, thereby reducing the performance delta between reading from the fastest storage devices and the slowest storage devices in the multi-client storage system.

In some embodiments, performing the out-of-order prefetching may include prefetching data based on how and/or where the data for particular content is stored. Such out-of-order prefetching may maximize or increase the average amount of data that is read or prefetched with each read operation. The out-of-order prefetching may deviate from conventional prefetching in which frames, segments, blocks, and/or other data for the particular content are retrieved in sequential order even though the data may not be stored sequentially by a storage device. Sequential retrieval of non-sequentially stored data may result in the storage device performing more seek operations and more read operations than when performing the out-of-order prefetching to retrieve the same data.

Figure 1:
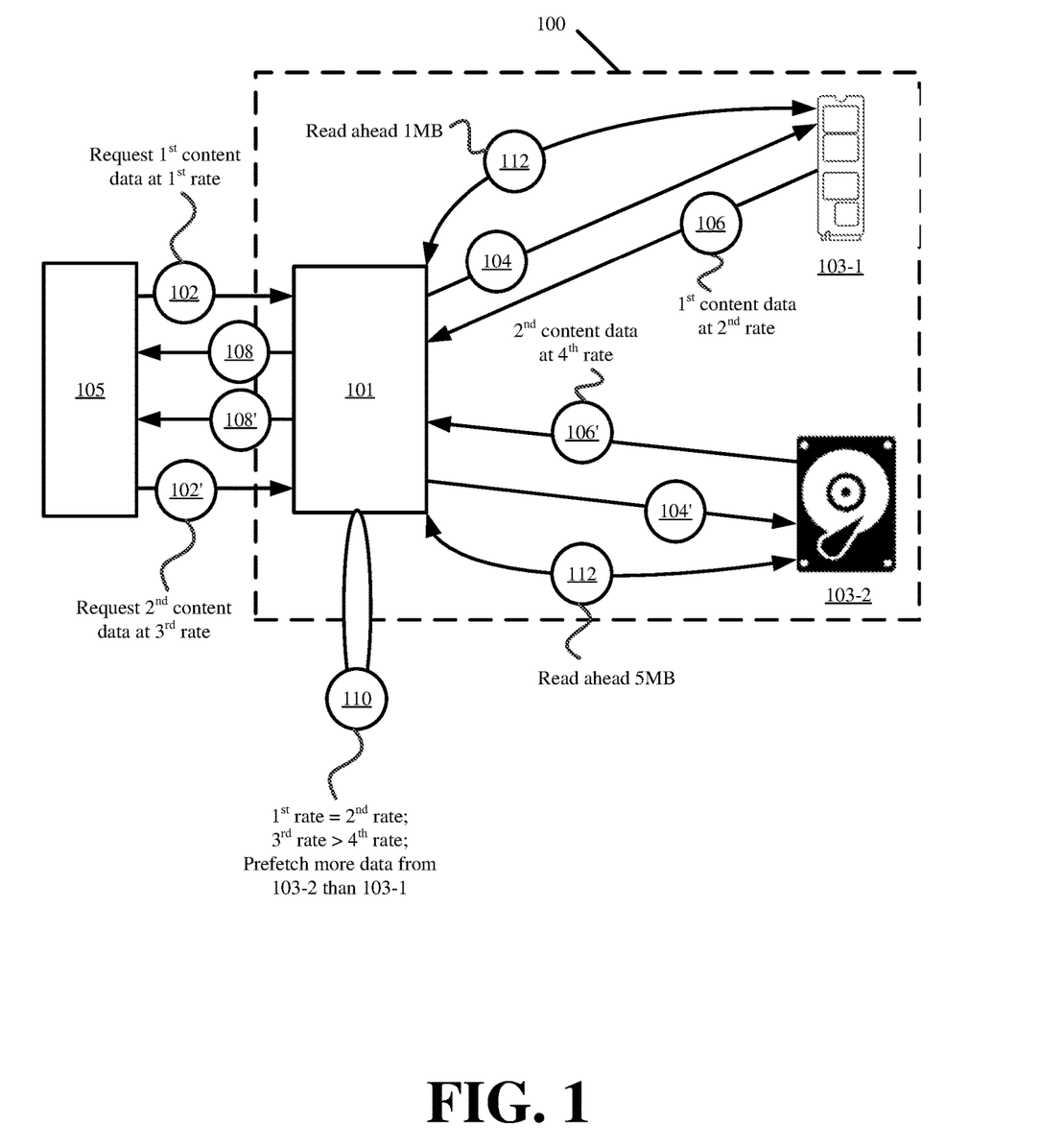
FIG. 1 illustrates a predictive read ahead example for prefetching data based on the content request rate and storage performance of the individual storage devices in accordance with some embodiments presented herein.

FIG. 1 illustrates a predictive read ahead example for prefetching data based on the content request rate and storage performance of the individual storage devices in accordance with some embodiments presented herein. As shown in FIG. 1, predictive read ahead system 100 may include controller 101 and at least two different storage devices 103-1 and 103-2 (sometimes collectively referred to as "storage devices 103" or individually as "storage device 103").

One or more client devices 105 may request (at 102) frames, segments, and/or other data of first content from predictive read ahead system 100 at a first rate. The first content may include one or more files, and the data from the one or more files may be stored on first storage device 103-1. Controller 101 may receive (at 102) the requests at the first rate, may determine that the requested first content data is not stored in local cache, and may issue (at 104) read operations for the requested data to first storage device 103-1. First storage device 103-1 may return (at 106) the data at a second rate. Controller 101 may receive the first content data from first storage device 103-1, may selectively cache the data, and/or may provide (at 108) the data to requesting client device 105.

Simultaneously or during an overlapping period of time, one or more client devices 105 may request (at 102') frames, segments, and/or other data of second content from predictive read ahead system 100 at a third rate. The second content may be stored on second storage device 103-2. In response to the requests for the second content data resulting in cache misses at controller 101, controller 101 may issue (at 104') read operations for the requested data to second storage device 103-2, and second storage device 103-2 may return (at 106') the data at a fourth rate. Controller 101 may cache and/or forward (at 108') the second content data to requesting client device 105.

Controller 101 may analyze (at 110) the first rate at which client device 105 requests (at 102) the first content, the second rate at which first storage device 103-1 provides (at 106) the requested first content data, the third rate at which client device 105 requests (at 102') the second content, and the fourth rate at which second storage device 103-2 provides (at 106') the requested second content data. Controller 101 may determine that the first request rate for the first content is equal to the second request rate for the second content, and that the third rate for storage performance of first storage device 103-1 is greater than the fourth rate for storage performance of second storage device 103-2. For instance, the first content and the second content may correspond to different video streams that client devices 105 request at a rate of 1 megabytes per second ("MBps"). First storage device 103-1 may provide (at 106) the first content data at a rate of 10 MBps, and second storage device 103-2 may provide (at 106') the second content data at a rate of 1.5 MBps.

Conventional prefetching would cause controller 101 to prefetch the same amount of data for the first content and the second content because of the first request rate and the second request rate being equal. However, in predictive read ahead system 100, controller 101 may also account for the difference in storage performance between first storage device 103-1 and second storage device 103-2 in determining to prefetch and cache more of the second content than the first content because of the slower performance of second storage device 103-2 relative to first storage device 103-1. In particular, controller 101 may determine that first storage device 103-1 may respond with the first content data more quickly than second storage device 103-2, and may refill the cache more quickly than second storage device 103-2 in the event the request rate for the first content increases and/or first storage device 103-1 experiences a slow down as a result of having to perform storage operations for other files or more time consuming operations (e.g., a larger mix of write operations than read operations). In other words, the third rate may indicate that first storage device 103-1 has a larger tolerance for change, and the fourth rate may indicate that second storage device 103-2 has a smaller tolerance for change such that a particular change in the performance of first storage device 103-1 is unlikely to impact the first content user experience (e.g., playback or processing of the first content), whereas the same particular change in the performance of second storage device 103-2 may interrupt or otherwise impact the second content user experience (e.g., playback or processing of the second content). Accordingly, controller 101 may predictively read (at 112) ahead and cache more of the second content data than the first content data based on the different observed storage device performance. As shown in FIG. 1, controller 101 may predictively read (at 112) ahead and cache 5 megabytes ("MB") of the second content from second storage device 103-2, while only reading (at 112) ahead and caching 1 MB of the first content from first storage device 103-1 before either of the prefetched data is requested by client devices 105.

Figure 2:
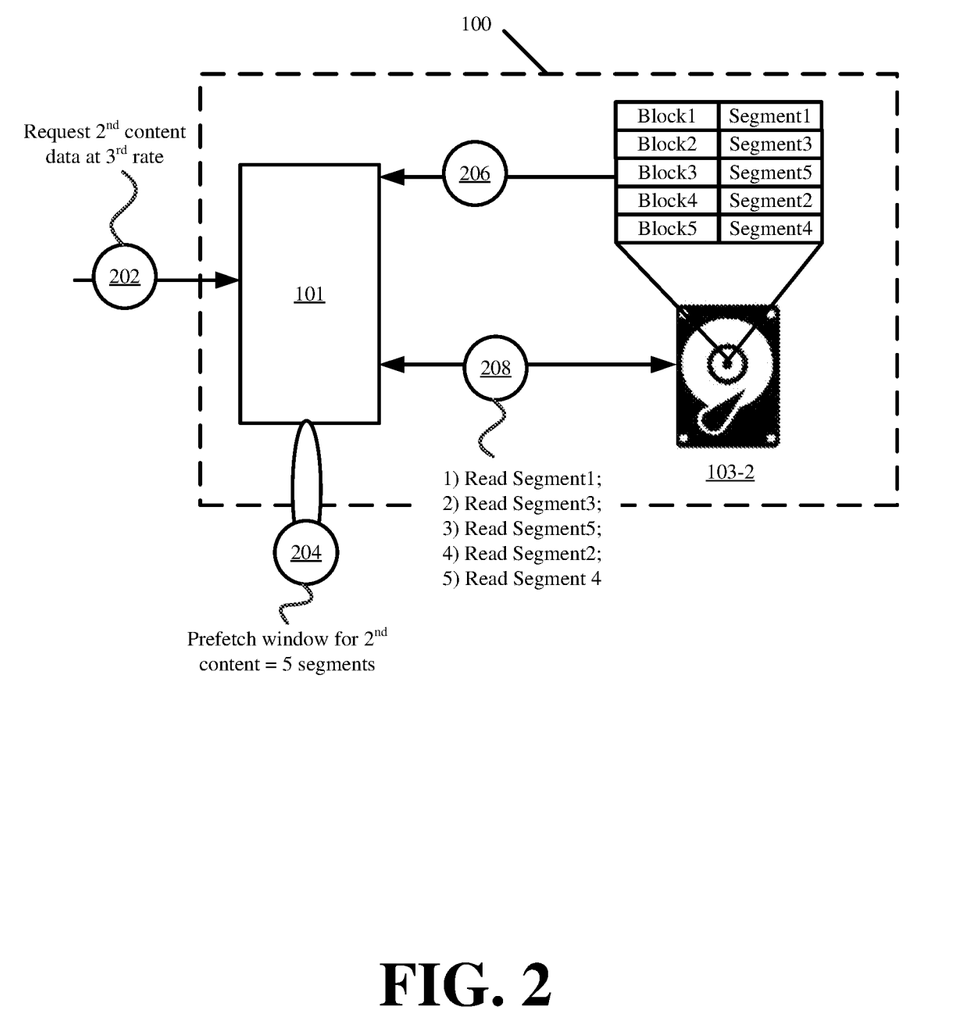
FIG. 2 illustrates a predictive read ahead example in which data for particular media content is prefetched out-of-order in accordance with some embodiments presented herein.

FIG. 2 illustrates a predictive read ahead example in which data for particular media content is prefetched out-of-order in accordance with some embodiments presented herein. Controller 101 may determine (at 202) a rate of requests at which the particular media content is requested and/or read from second storage device 103-2. Based on the rate of requests, performance of second storage device 103-2, and/or other factors, controller 101 may set (at 204) the prefetch window for the particular media content to be 5 segments ahead of the current requested segment of the particular media content.

Controller 101 may inspect (at 206) an index table that maps stored data on second storage device 103-2 to physical storage blocks of second storage device 103-2. Specifically, the index table may identify the storage blocks at which different segments of the particular media content are stored. Controller 101 may determine that the segments are stored out-of-order. Accordingly, a sequential prefetching of the particular media content may include issuing requests that cause second storage device 103-2 to seek and locate different storage blocks where each of the sequential segments is stored, and may cause second storage device 103-2 to read out less data than could be retrieved with a single read operation resulting in more read operations being required to complete the sequential prefetching of the out-of-order stored segments. Accordingly, the predictive read ahead may include controller 101 performing (at 208) an out-of-order prefetching of the stored segments to reduce the seek delays and the number of read operations.

Figure 3:
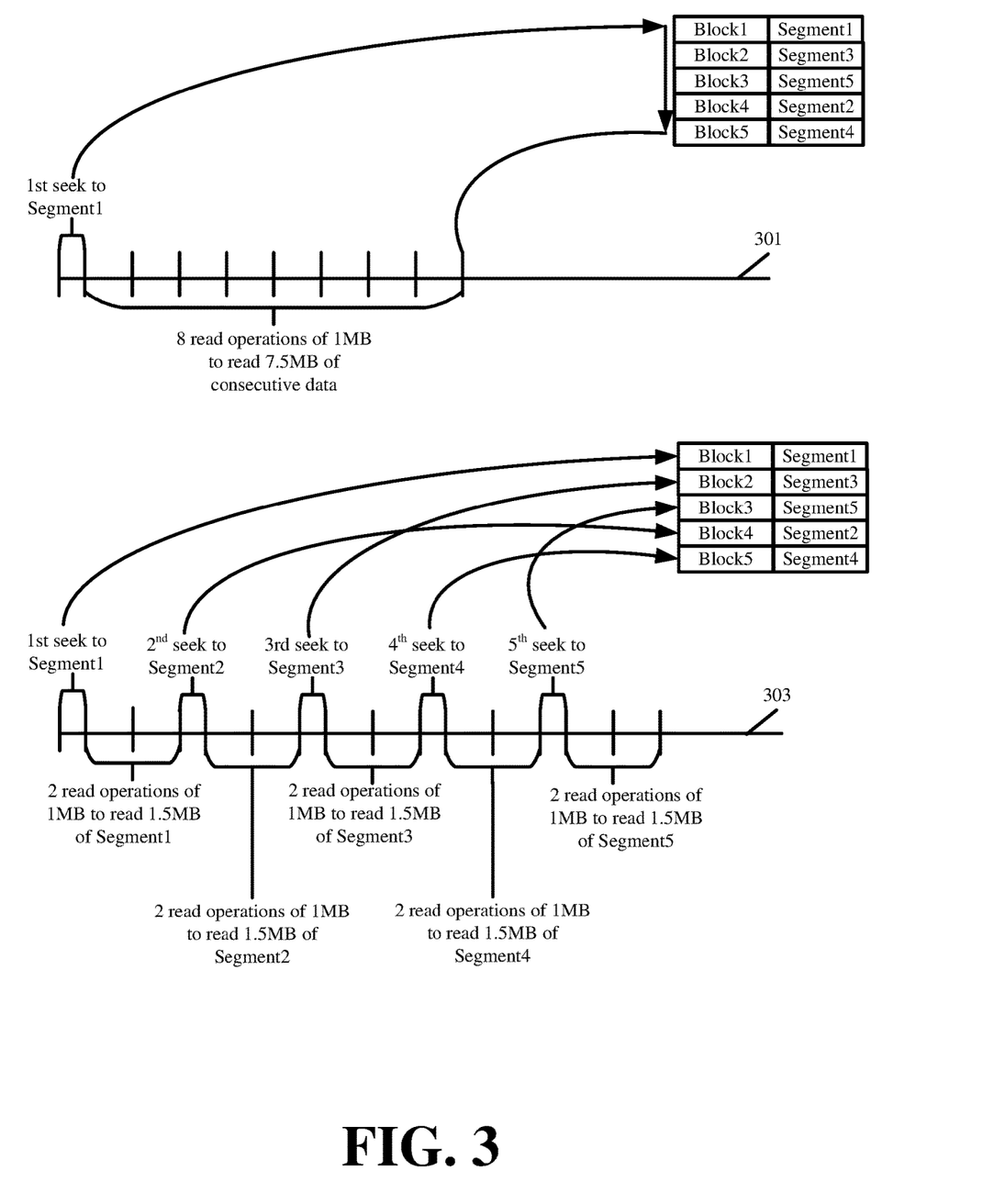
FIG. 3 illustrates storage performance improvements that result from performing the out-of-order prefetching versus a conventional sequential prefetching of the same data in accordance with some embodiments presented herein.

FIG. 3 illustrates storage performance improvements that result from performing the out-of-order prefetching of the 5 particular media content segments versus a conventional sequential prefetching of the same 5 particular media content segments from second storage device 103-2. In particular, FIG. 3 illustrates first example timeline 301 for the out-of-order prefetching of the particular media content segments, and second example timeline 303 for the sequential prefetching of the particular media content segments. Each segment may consume 1.5 MB of storage.

First example timeline 301 may include a delay for a single seek operation to locate the first segment, and a delay for performing 8 1 MB read operations to retrieve the 7.5 MB of data for the non-sequentially stored 5 segments. Second example timeline 303 may include a first delay for seeking the location of the first segment, a delay for performing 2 1 MB read operations to retrieve the 1.5 MB of the first segment, a second delay for seeking the location of the second segment, a delay for performing 2 1 MB read operations to retrieve the 1.5 MB of the second segment, a third delay for seeking the location of the third segment, a delay for performing 2 1 MB read operations to retrieve the 1.5 MB of the third segment, a fourth delay for seeking the location of the fourth segment, a delay for performing 2 1 MB read operations to retrieve the 1.5 MB of the fourth segment, a fifth delay for seeking the location of the fifth segment, and a delay for performing 2 1 MB read operations to retrieve the 1.5 MB of the fifth segment. Accordingly, the total time to complete the out-of-order prefetching for the predictive read ahead may include the delay for a single seek operation and 5 read operations, whereas the total time to complete a conventional sequential prefetching of the same data may include the delay for 5 seek operations and 10 read operations.

Figure 4:
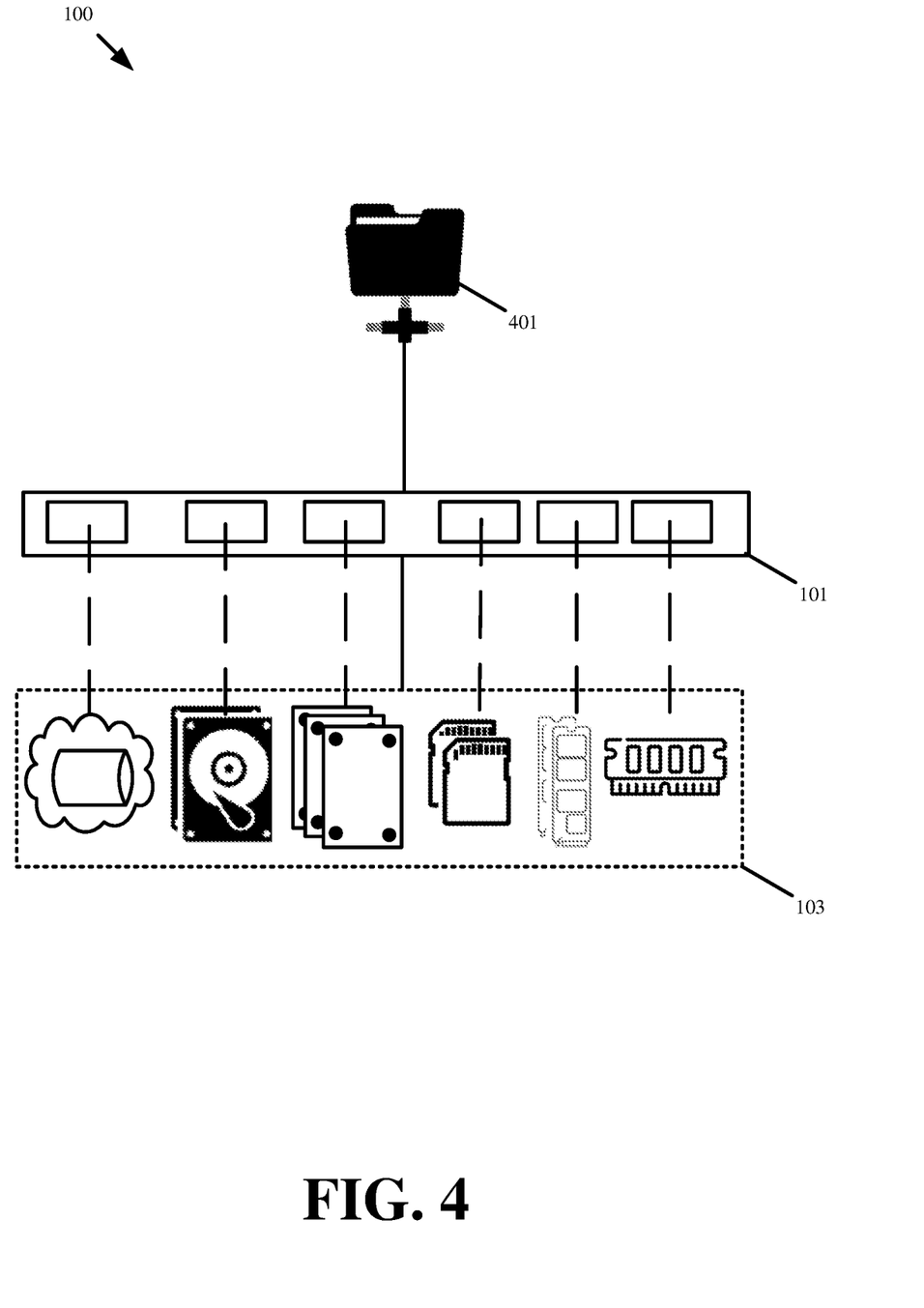
FIG. 4 illustrates an example architecture for a predictive read ahead system in accordance with some embodiments presented herein.

FIG. 4 illustrates an example architecture for predictive read ahead system 100 in accordance with some embodiments presented herein. Predictive read ahead system 100 may include one or more controllers 101, multiple storage devices 103, and/or file system 401. Predictive read ahead system 100 may represent an optimized distributed file system or optimized network file system that different client devices may access in order to read and write data to storage devices 103.

Controller 101 may include one or more devices that may cache data from different data stored to one or more storage devices 103. The stored content may include media streams, objects, services, applications, and/or different files.

In some embodiments, controller 101 may provide a caching layer for file system 401 in which cached data for read operations issued by file system 401 may be directly served by controller 101 without accessing any of storage devices 103. The cache of controller 101 may include fast Random-Access Memory ("RAM") and/or flash memory, and may be several gigabytes in size. In any case, responding to a read operation with cached data from controller 101 may be several milliseconds to seconds faster than responding from any of storage devices 103.

In some embodiments, controller 101 may be a caching device or component that is in the storage path between client devices and storage devices 103. In some such embodiments, controller 101 may act as a proxy that inspects read and write requests that are issued by the client devices and/or file system 401 in order to determine if the requested data is cached. If cached, controller 101 may intercept the request and directly respond to the request with data from cache. Otherwise, controller 101 may forward the request to the appropriate storage device 103 that stores the requested data. Controller 101 may also inspect the responses that are provided by one or more storage devices 103 in order to selectively cache the returned data, track storage device 103 performance, and/or perform the predictive read ahead of some embodiments.

In some embodiments, a single controller 101 may provide a centralized caching layer for all storage devices 103. In other words, the single controller 101 may selectively cache any data from any storage device 103 and/or may inspect all read requests issued by all client devices for any data that is stored on any of storage devices 103.

In some other embodiments, a different controller 101 may be located and/or may operate in conjunction with a different storage device 103. In some such embodiments, a different controller 101 may provide a separate cache for each storage device 103 or a different subset of storage devices 103.

Storage devices 103 may include solid state disks, flash memory, optical storage devices, and/or other fast performing storage devices that store and/or access data without moving components. Storage devices 103 may also include magnetic disks, storage devices that write to physical media, mechanical storage devices, and/or other slow performing storage devices that store and/or access data via moving components.

Predictive read ahead system 100 may scale to include any number, combination, and/or type of storage devices 103. For instance, storage devices 103 may include three fast performing storage devices and two slow performing storage devices with the fast and/or slow storage devices coming from different manufacturers, having different storage capacities, and/or providing different storage performance.

Other factors, besides the underlying storage technology, may affect the storage performance of storage devices 103. For instance, some storage devices 103 may include cloud or network storage devices that are remotely accessible via a data network. Network latency for communications between file system 401 and the cloud or network storage devices may impact availability and/or performance of those storage devices 103. Also, a first storage device 103 that has a lower percentage of unused capacity (e.g., a greater percentage of used capacity), than an otherwise identical second storage device 103, may be slower performing because the second storage device 103 is able to perform more sequential writes, whereas the first storage device 103 may have to perform slower random writes to nonsequential blocks.

Using different block and/or record sizes to read and write data may also affect performance of otherwise identical storage devices 103. Performance of storage devices 103 may also be affected based on the input/output stream or sequence of storage operations that are generated. For instance, a sequence of read operations may be issued and may target data that is stored to a first storage device 103, thereby making that first storage device 103 unavailable for write operations until the read operations are completed. Similarly, storage devices 103 may be faster to read or write sequential data versus random or non-sequential data as a result of having to perform fewer seek operations.

In some embodiments, storage devices 103 may be local to and/or running on the same machine or device as controller 101 and/or file system 401. In some embodiments, storage devices 103 may be connected to controller 101 and/or file system 301 with high speed and/or high bandwidth interfaces. Examples of interfaces for directly connecting storage devices 103 to predictive read ahead system 100 may include advanced technology attachment ("ATA"), small computer system interface ("SCSI"), serial attached SCSI ("SAS"), and/or peripheral component interconnect express ("PCIe").

As noted above, storage devices 103 may also include one or more storage nodes that are remote from the devices on which controller 101, file system 401, and/or the client devices run. In some such embodiments, controller 101, file system 401, and/or the client devices may access storage devices 103 via a data network.

The data network may include a packet-switched data network, a Local Area Network ("LAN"), a Wide Area Network ("WAN"), or network of networks (e.g., the Internet). The data network may support gigabit speeds (e.g., 1, 10, 100 gigabits per second), and may therefore have sufficient speeds to exceed the storage performance of each individual storage device 103, and/or the collective set of storage devices 103. Ethernet, fiber channel, and/or other networking technologies may be used to connect the client devices to predictive read ahead system 100.

File system 401 may control access to storage devices 103. File system 401 may receive each request that is issued by one or more client devices. Client devices may issue write requests to store data and/or content in the storage system that is formed by storage devices 103, and may issue read requests to retrieve the stored data and/or content. Client devices may issue the requests to file system 401 over a data network using network messaging such as HyperText Transfer Protocol ("HTTP") GET and POST messages, Distributed File System ("DFS") messaging, and/or other messaging. Additionally, client devices may issue the requests to file system 401 via Application Programming Interface ("API") calls, operating system commands, and/or other file system commands. The client device requests may target specific data and/or content using a Uniform Resource Locator ("URL"), a directory path, and/or another identifier or addressing.

File system 401 may control the distribution of the client device requests across storage devices 103 by controlling which storage devices 103 are used to store different content. For instance, file system 401 may write more popular content to faster performing storage devices 103, and less popular content to slower performing storage devices 103. Alternatively, file system 401 may identify latency sensitive content based on a file extension, encoding, and/or other factors, may store the latency sensitive content to faster performing storage devices 103, and may store the latency insensitive content to slower performing storage devices 103. Accordingly, file system 401 may track where the data for different content is stored on one or more of storage devices 103, and may issue read and/or write operations for particular content to a correct storage device 103 in response to client device issued requests to access that particular content.

File system 401 may establish a storage hierarchy by selectively storing different content to different storage devices 103 based on the storage performance of storage devices 103. File system 401 may move content up and down in the storage hierarchy as the demand for different content changes. Controller 101 may sit atop the storage hierarchy and/or at different layers of the storage hierarchy to provide caching and/or faster access to the data at each layer of the storage hierarchy.

The quantity of devices and/or networks, illustrated in FIG. 4, is provided for explanatory purposes only. In practice, predictive read ahead system 100 may include additional devices and/or networks, fewer devices and/or networks, different devices and/or networks, or differently arranged devices and/or networks than illustrated in FIG. 4. For instance, in some embodiments, controller 101 may directly interface with storage devices 103, and may directly issue read and/or write operations to storage devices 103. In some embodiments, predictive read ahead system 100 may be run as part of each client device. Alternatively, or additionally, one or more of the devices of predictive read ahead system 100 may perform one or more functions described as being performed by another one or more of the devices of predictive read ahead system 100. For instance, the functions and operations of file system 401 and controller 101 may be integrated into a single device or component. As noted above, devices of predictive read ahead system 100 may interconnect with each other and/or other devices via wired connections, wireless connections, or a combination of wired and wireless connections.

Figure 5:
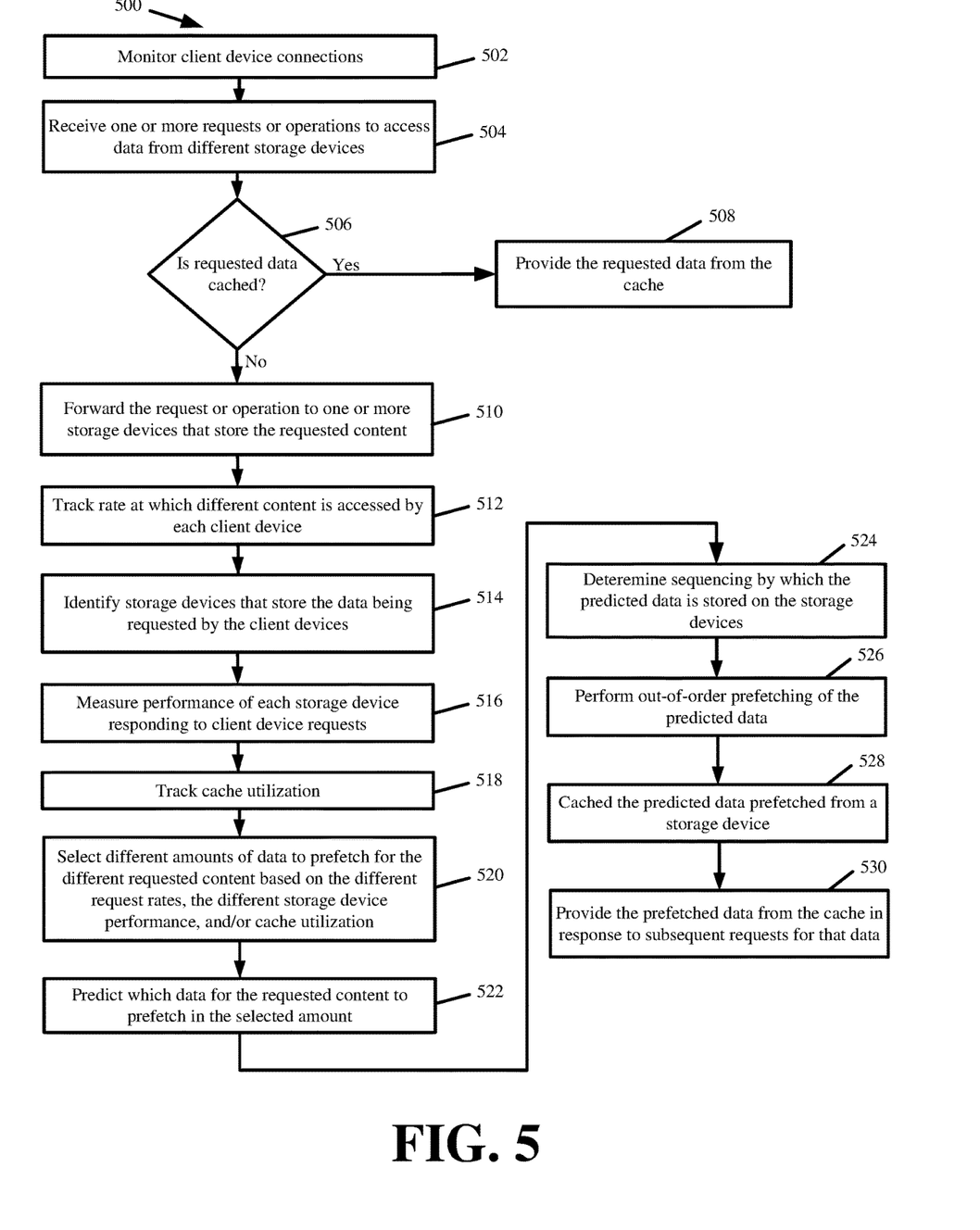
FIG. 5 presents a process for performing the predictive read ahead to dynamically prefetch data in accordance with some embodiments presented herein.

FIG. 5 presents a process 500 for performing the predictive read ahead to dynamically prefetch data in accordance with some embodiments presented herein. Process 500 may be performed by controller 101.

Process 500 may include monitoring (at 502) different client device connections with predictive read ahead system 100. Each connection may correspond to a network connection or an interface that is established between a client device and predictive read ahead system 100, and/or through which the client device may issue read and/or write requests to access storage devices 103.

Process 500 may include receiving (at 504) one or more requests or operations to access data from storage devices 103 of predictive read ahead system 100 as a result of monitoring (at 502) the connections. Controller 101 may receive one or more read requests that are directly issued by the client devices to retrieve data that is stored on storage devices, or may receive read operations that file system 401 issues for specific storage devices in response to read requests from the client devices.

Process 500 may include determining (at 506) if the requested data is cached at controller 101. In response to determining (at 506—Yes) that the requested data is cached, process 500 may include providing (at 508) the requested data from the controller cache and/or intercepting the request or operation to prevent execution by one or more storage devices 103. In response to determining (at 506—No) that the requested data is not cached, process 500 may include forwarding (at 510) the request or operation to one or more storage devices 103 that store the requested content, and performing the predictive read ahead for the request or operation.

Performing the predictive read ahead may include tracking (at 512) a rate at which different content is accessed by each client device. Controller 101 may monitor the request rates of content from each client device independently. In some embodiments, controller 101 may store a table or counter that includes a unique identifier for each client device, a unique identifier (e.g., storage path or URL) for the content accessed by a client device, and/or a rate at which the content is accessed by a particular client device. For instance, controller 101 may determine that a first client device requests data for first content at a rate of 24 frames per second ("fps"), and may determine that a second client device requests data for second content at a rate of 120 fps.

Process 500 may include identifying (at 514) one or more storage devices 103 that store the data being requested by the client devices. In some embodiments, storage devices 103 that store the requested data may be identified via a path, URL, or other addressing in the client device issued requests, or via a look up to a storage device 103 index table that stores a mapping of different content stored to blocks of that storage device 103.

Process 500 may include measuring (at 516) performance of each storage device 103 responding to client device requests. Controller 101 may measure (at 516) storage device 103 performance dynamically based on the responsiveness and/or amount of data that is read and/or written by a storage device 103. Alternatively, controller 101 may track performance of storage devices 103 over time or may be configured with expected performance of storage device 103, and may measure (at 516) the performance from the prior measures.

Process 500 may include tracking (at 518) cache utilization at controller 101. For instance, controller 101 may track (at 518) available space in the cache for caching new data or content. If the cache is empty (e.g., less than 90% capacity), controller 101 may aggressively cache new requested data, whereas if the cache is mostly full (e.g., at 90% capacity), controller 101 may avoid evicting data that may be reused from the cache and may less aggressively cache newly requested data in the cache. In some embodiments, controller 101 may track (at 518) cache utilization based on the total volume of requests being issued by the client devices over a period of time. For instance, when the total volume of requests over a particular period of time (e.g., 10 minutes) is less than a threshold amount, then the client devices may request less content, and controller 101 may prefetch more data for each of the requested content. Conversely, when the total volume of requests over the particular period of time exceeds the threshold amount, then the client devices may request more content, and controller 101 may prefetch less data for each of the requested content.

Process 500 may include selecting (at 520) different amounts of data to prefetch for the different requested content based on the different request rates, the different storage device performance, and/or the utilization of the cache. For instance, controller 101 may select (at 520) to read ahead 5 MB of data for first content and 2 MB of data for second content, or may select (at 520) to read ahead 3 segments of media content, and 2 files of other content. Since the same content may be simultaneously requested by different client devices, controller 101 may use the request rate from the client device that requests the content at the fastest rate when determining the amount of data to prefetch for that content. In some embodiments, controller 101 may bias the request rate based on the total number of client devices that simultaneously request the same content, wherein the total number of client devices that simultaneously request the same content may be an indication of demand that may affect how much of the content to prefetch. In some embodiments, controller 101 may prioritize the caching of content that receive higher request rates and that are stored on slower performing storage devices 103. In some such embodiments, controller 101 may assign a first set of scores or weights based on the request rates, and/or a second set of scores or weights based on the storage device 103 performance. Controller 101 may generate an aggregate score for each content based on the first set of scores and the second set of scores, and may allocate different amounts or proportions of the available cache based on the aggregate scores. For example, controller 101 may prefetch 3 times the data for first content with an aggregate score of 3 than for second content with an aggregate score of 1. Controller 101 may preserve the prefetch proportions for the different content, but may limit the amount of data that is prefetched according to the cache availability. Continuing with the above example, controller 101 may prefetch 3 MB of the first content and 1 MB of the second content when the cache is 90% utilized, and may prefetch 30 MB of the first content and 10 MB of the second content when the cache is 30% utilized.

Process 500 may include predicting (at 522) which data for the requested content to prefetch in the selected (at 520) amount. In some embodiments, controller 101 may track a pattern and/or ordering by which a client device retrieves data for particular content, and may predict (at 522) the next data from the particular content that may be retrieved by the client device based on the determined ordering. For instance, controller 101 may determine from the requested filenames or the manner in which data for particular content on a storage device 103 are accessed that a client device is playing back a stream in reverse. Accordingly, controller 101 may predict (at 522) that earlier segments of the stream may be retrieved next by the client device. As another example, controller 101 may determine a pattern by which files in a particular directory on a storage device 103 are accessed, and may predict (at 522) subsequent files from the particular directory that will be accessed based on the determined pattern. As will be described below, controller 101 may use artificial intelligence and/or machine learning to increase the accuracy of the predicted data to prefetch.

Process 500 may include determining (at 524) the sequencing by which the predicted data for the selected content is stored on storage devices 103, wherein the predicted data is a specific set and/or amount of data from the selected content that controller 101 is to prefetch. Determining (at 524) the sequencing may include controller 101 accessing an index table for storage device 103 that stores the predicted data, and identifying, based on the index table, the storage blocks of that storage device 103 that are being used to store the predicted data. Oftentimes, the sequencing may reveal that the predicted data is stored in non-consecutive storage blocks of the storage device 103 such that a sequential retrieval of the predicted data may result in a set of random reads at storage device 103.

Accordingly, process 500 may optimize the reading of the predicted data by performing (at 526) an out-of-order prefetching of the predicted data. Performing (at 526) the out-of-order prefetching may include generating a set of read operations for reading the predicted data from storage device 103, reordering the read operations to maximize the reading of the predicted data from consecutive blocks of storage device 103, coalescing two or more read operations for reading consecutive blocks of storage device 103 into a single read operation, and/or providing the reordered and coalesced read operations to storage device 103 to prefetch the predicted data in a non-sequential order that mirrors how the predicted data was written to the storage blocks of storage device 103 (e.g., a first order that is different than a second order by which the client devices are expected to request and/or access the predicted data).

Process 500 may include caching (at 528) the predicted data that is prefetched from storage device 103 to a local cache of controller 101. In particular, controller 101 requests and caches the predicted prior to any client devices issuing a first request for that data.

Process 500 may include providing (at 530) the prefetched data from the cache, instead of storage devices 103, in response to subsequent requests for that data being issued by the client devices or file system 401. Controller 101 may intercept the requests, determine that the requested data is cached, and may serve the requested data from the cache without forwarding the requests to storage devices 103 where the data is also stored.

Figure 6:
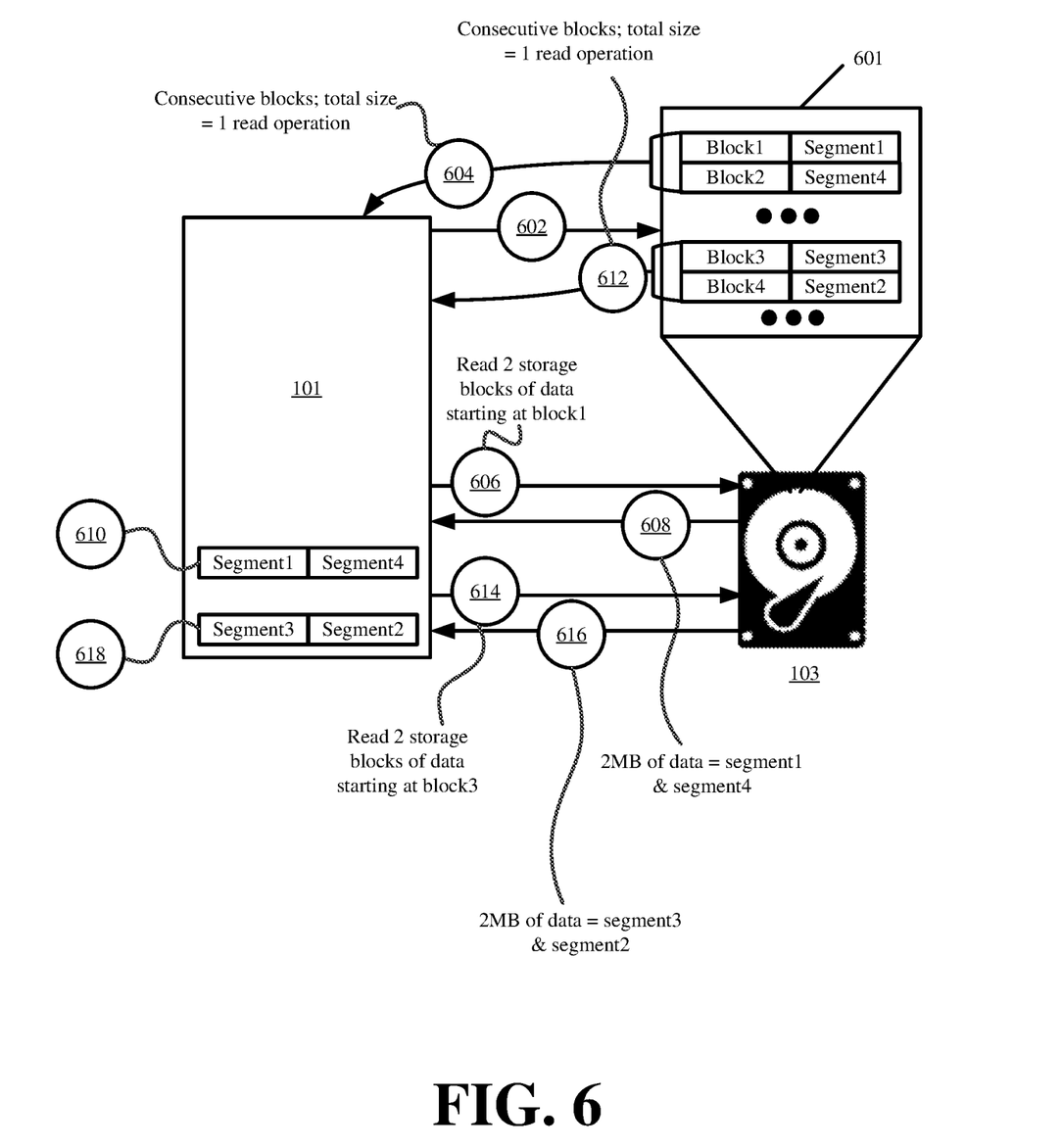
FIG. 6 illustrates an example of the out-of-order prefetching performed as part of the predictive read ahead operation in accordance with some embodiments presented herein.

FIG. 6 illustrates an example of the out-of-order prefetching performed as part of the predictive read ahead operation in accordance with some embodiments presented herein. Controller 101 may determine to prefetch 4 segments of a particular media stream in response to requests rates for the particular media stream, performance of storage device 103 storing the particular media stream, and/or availability of controller's 101 cache.

Controller 101 may access (at 602) index table 601 of storage device 103 to determine that a first prefetch segment is stored in a first storage block, a fourth prefetch segment is stored in a second storage block that is after the first storage block, a third prefetch segment is stored in a third storage block that is two or more storage blocks removed from the second storage block, and a second prefetch segment is stored in a fourth storage block that is after the third storage block. For explanatory purposes, it is assumed that each segment may be 1 MB in size, each storage block of storage device 103 may store 1 MB of data, and storage device 103 may read out 2 MB of data with every read operation.

Rather than perform a first seek operation to locate the first storage block, perform a first read operation to read 1 MB of the first segment from the first storage block, perform a second seek operation to locate the fourth storage block, perform a second read operation to read 1 MB of the second segment from the fourth storage block, perform a third seek operation to locate to the third storage block, perform a third read operation to read 1 MB of the third segment from the third storage block, perform a fourth seek operation to locate the second storage block, and perform a fourth read operation to read 1 MB of the fourth segment from the second storage block, controller 101 may reorder and coalesce the read operations for the prefetch segments that stored out-of-order on storage device 103 to minimize the total number of read operations needed to prefetch all 4 segments.

As shown in FIG. 6, controller 101 may determine (at 604) that the first segment and the fourth segment are stored in consecutive or sequential storage blocks that can be read out with a single read operation. Specifically, controller 101 may determine that the first storage block stores 1 MB of the first segment included as part of the selected amount of data to prefetch for the particular media stream, that the next consecutive second storage block stores 1 MB of the fourth segment included as part of the selected amount of data to prefetch for the particular media stream, and that the data from both storage blocks may be read out with a single read operation. Accordingly, controller 101 may coalesce the first read operation and the fourth read operation into a single read operation, and may issue (at 606) the coalesced single read operation to storage device 103. Storage device 103 may perform a single seek operation to locate the first storage block, may read 2 MB of consecutive data for the first segment and the fourth segment from the first storage block and the second storage block respectively, and may provide (at 608) the 2 MB of data to controller 101. Controller 101 may cache (at 610) the first and fourth segments.

Controller 101 may determine (at 612) that the third segment and the second segment are also stored in consecutive or sequential storage blocks that can be read out with a single read operation. Accordingly, controller 101 may generate and send (at 614) another coalesced read operation for storage device 103 to read out the subsequent 2 MB of data for the third segment and the second segment. Controller 101 may receive (at 616) the 2 MB of data representing the third segment and the second segment from storage device 103, and may cache (at 618) the data.

As noted above, controller 101 may use artificial intelligence and/or machine learning to predict next data that a client device may access, and/or to determine the sequencing of the predicted data and the corresponding storage locations of the predicted data on one or more storage devices 103. Controller 101 may determine the sequencing as the data is written to a particular storage device 103 and the index table of the particular storage device 103 is updated. By determining the data sequencing, controller 101 may be able to prefetch data that does not follow a sequential or ordered naming convention.

For example, segments of a first media content may follow a sequential naming convention: "segment_1," "segment_2," etc. However, segments of a second media content may not use a sequential naming convention, and instead may identify next segments based on their start times. For instance, segments of the second media content may be named "segment_0000," "segment_1234," "segment_2113," etc. In this example, controller 101 may be unable to prefetch next segments of the second media content as controller 101 may not dynamically generate the seemingly randomized segment names. However, controller 101 may track the sequence with which the second media content data is written to a particular storage device 103 in order to predict the next data that comes after requested data and/or to prefetch the next data without referencing the segment names or file names.

Figure 7:
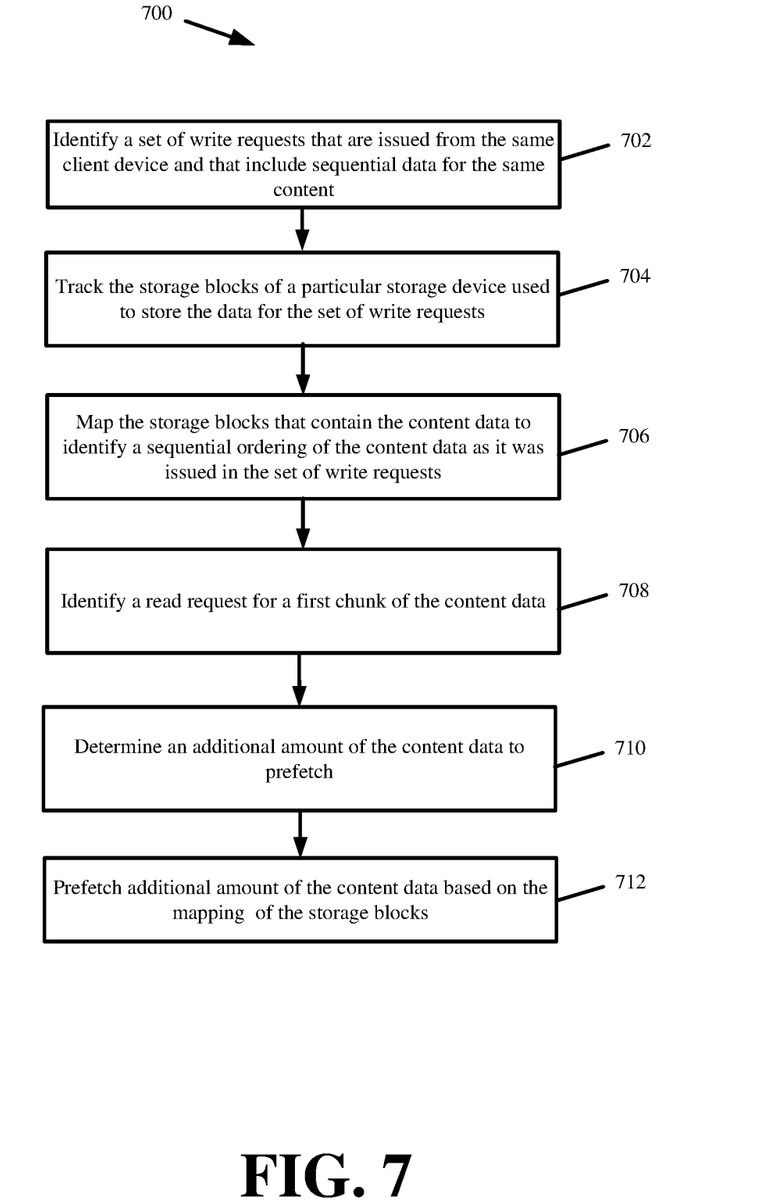
FIG. 7 presents a process for predicting next data to prefetch for particular content based on stored sequencing of the particular content in accordance with some embodiments presented herein.

FIG. 7 presents a process 700 for predicting next data to prefetch for particular content based on stored sequencing of the particular content in accordance with some embodiments presented herein. Process 700 may be performed by controller 101, and may represent the artificial intelligence and/or machine learning used by controller 101 to accurately select next data to prefetch for requested content without referencing file.

Process 700 may include identifying (at 702) a set of write requests that are issued from the same client device and that include sequential data for the same content. For instance, to write a file or other content to storage devices 103, a client device may issue several write requests that contain sequential chunks of the content data. Several write requests may be required due to network fragmentation of the content data and/or file system 401 limitations on how much data can be written with each write operation. In some embodiments, the set of write requests may include at least one common identifier that identifies the client device issuing the requests and/or the content to which the data belongs. The common identifier may include a URL, directory path, and/or filename. Alternatively, controller 101 may inspect the data to determine that the data in the set of write requests is encoded, formatted, and/or otherwise representative of different data for the same content.

Process 700 may include tracking (at 704) the storage blocks of a particular storage device 103 used to store the data for the set of write requests. In some embodiments, controller 101 may track (at 704) the storage blocks by monitoring confirmation messaging from the particular storage device 103 that provide the storage block identifiers, and/or by monitoring changes that the particular storage device 103 makes to its index table after writing the data.

The data for the set of write requests may not be stored in consecutive storage blocks of storage device. Accordingly, process 700 may include mapping (at 706) the storage blocks that contain the content data to identify a sequential ordering of the content data as it was issued in the set of write requests.

Figure 8:
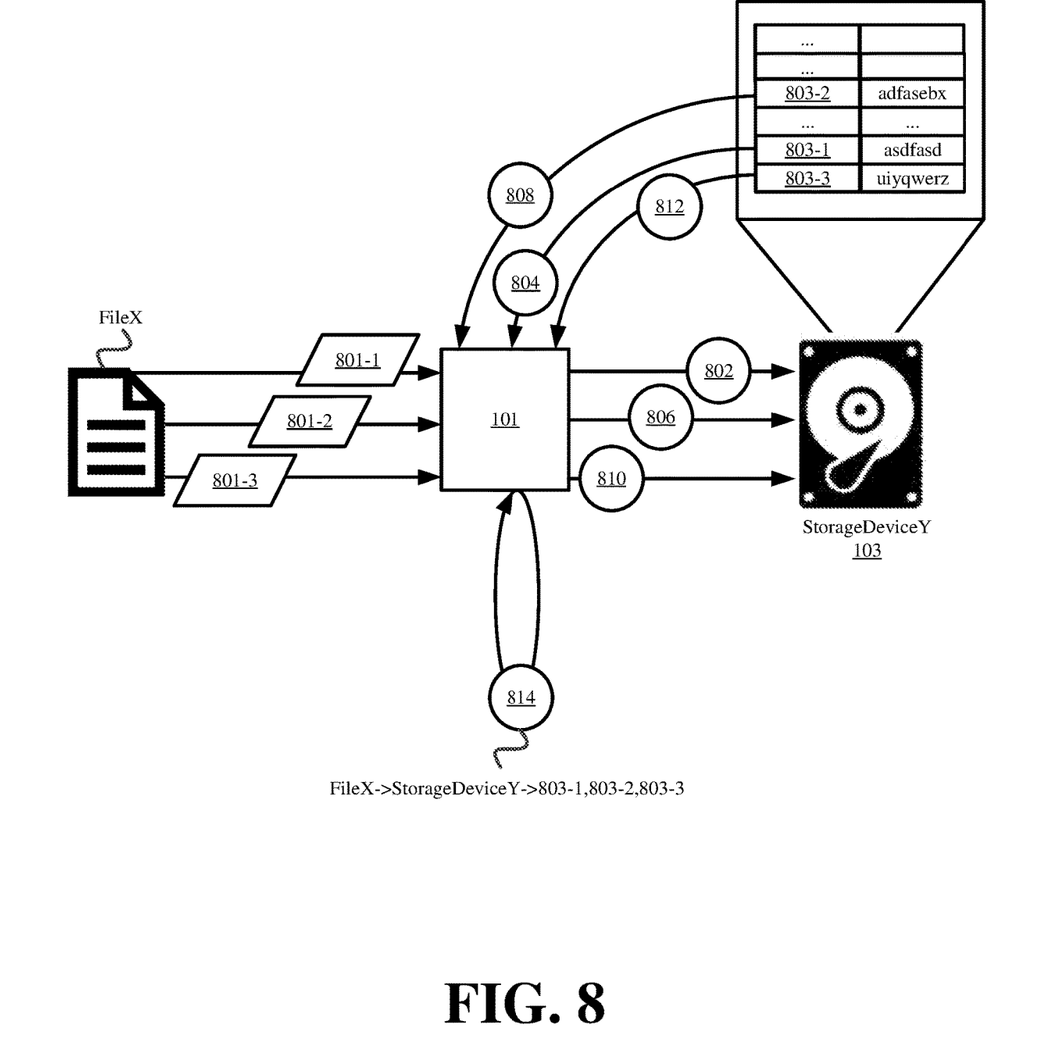
FIG. 8 illustrates an example for mapping the sequential data for particular content to non-sequential storage blocks that contain the particular content data.

FIG. 8 illustrates an example for mapping the sequential data for particular content to non-sequential storage blocks that contain the particular content data. As shown in FIG. 8, controller 101 may receive three write requests 801-1, 801-2, and 801-3 (sometimes collectively referred to as "write requests 801" or individually as "write request 801") that are issued by a client device and that include the data for the particular content in order.

Controller 101 may forward (at 802) first write request 801-1 to storage device 103, and may track where the data for first write request 801-1 is written on storage device 103. In particular, controller 101 may determine (at 804) that storage device 103 updates an index table entry for storage block 803-1 after writing the data from first write request 801-1, and/or providing confirmation messaging to file system 401 that the data from first write request 801-1 was successfully stored.

Similarly, controller 101 may forward (at 806) second write request 801-2 to storage device 103, determine (at 808) that storage device 103 updates an index table entry for storage block 803-2 after writing the data from second write request 801-2, forward (at 810) third write request 801-3 to storage device 103, and determine (at 812) that storage device 103 updates an index table entry for storage block 803-3 after writing the data from third write request 801-3.

Controller 101 may generate (at 814) a mapping based on the tracked writing of the ordered data from requests 801-1, 801-2, and 801-2 to the non-sequential storage blocks 803-1, 803-2, and 803-3 of storage device 103. In some embodiments, the mapping may include an identifier for the particular content and identifiers for storage blocks 803-1, 803-2, and 803-3 in the order to which the data for the particular content was written.

With reference back to FIG. 7 and/or after generating the ordered mapping of content data to non-sequential storage blocks of storage device 103, process 700 may include identifying (at 708) a read request for a first chunk of the content data. The first chunk of the content data may not be cached by controller 101. Accordingly, controller 101 may forward the read request to storage device 103 that stores the requested content, and controller 101 may identify which storage block particular storage device 103 accesses in order to read out the requested first chunk of data.

Process 700 may include determining (at 710) an additional amount of the content data to prefetch, and may include prefetching (at 712) the additional amount of the content data based on the mapping (at 706) of the storage blocks. With reference back to the example illustrated in FIG. 8, controller 101 may determine that storage device 103 reads the data from storage block 803-1 in response to the read request, may determine, based on the generated mapping, that storage device 103 wrote data for the same content to storage blocks 803-2 and 803-3 after writing to storage block 803-1, and therefore may issue one or more prefetch requests to read the data from storage blocks 803-2 and 803-3 prior to the client device requesting the data stored in those storage blocks 803-2 and 803-3 and/or in response to the read request that accessed only storage block 803-1.

In some embodiments, controller 101 may perform evictionless caching to optimize the predictive read ahead and/or reduce the overhead associated with managing the cache. Specifically, controller 101 may devote additional resources to dynamically prefetching the data and populating the cache, and less or no resources to clearing data from the cache.

The evictionless caching may include controller 101 populating a cache table as new data is entered into the controller cache. The cache table may include an entry for each cache location (e.g., cache block or cache slot) and/or an identifier for data that may be cached in that cache location.

Controller 101 may track the number of times each cache location is accessed over time in order to determine the demand for the data that is cached at that cache location. Controller 101 may access a particular cache location in response to receiving a read request for the data of particular content and determining that the requested data is cached at that particular cache location.

Periodically, or in response to certain events (e.g., cache utilization exceeding a threshold), controller 101 may free the cache by identifying the cache locations that are least utilized, and by removing the identifiers for the data stored at those cache locations from the cache table. It should be noted that controller 101 may not flush or remove the data from the cache location. By simply removing the identification of data from a caching location entry in the caching table, controller 101 makes that caching location entry available for caching of new data. In particular, controller 101 may overwrite the existing data when caching new data to that caching location.

Figure 9:
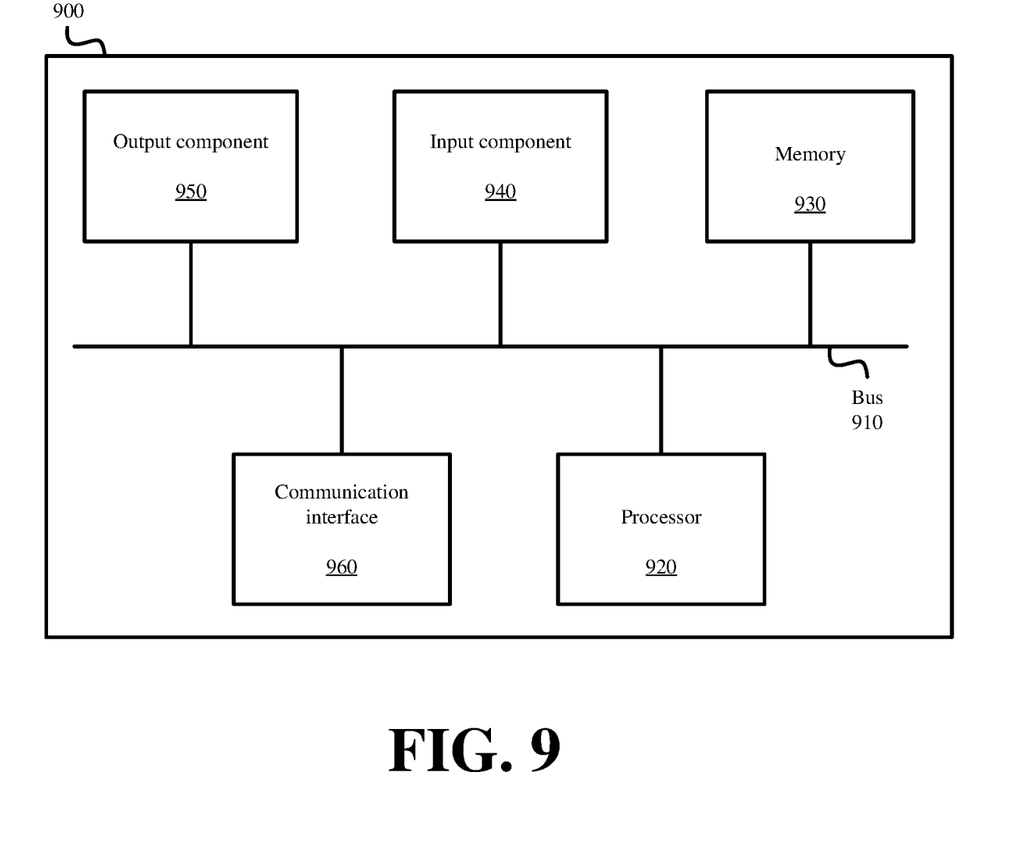
FIG. 9 illustrates example components of one or more devices, according to one or more embodiments described herein.

FIG. 9 is a diagram of example components of device 900. Device 900 may be used to implement one or more of the devices or systems described above (e.g., controller 101, storage devices 103, file system 401, client devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a first set of requests at a first rate to read a first set of data of first content from a first storage device in a storage system, and a second set of requests at a different second rate to read a first set of data of second content from a second storage device in the storage system;
   determining a first measure of performance for the first storage device that is different than a second measure of performance for the second storage device;
   prioritizing an allocation of cache based on a first difference between the first rate and the second rate, and a second difference between the first measure of performance and the second measure of performance; and
   prefetching a first amount of data for the first content from the first storage device and a different second amount of data for the second content from the second storage device to the cache based on the first difference and the second difference.

2. The method of claim 1, wherein said prefetching comprises:
   retrieving the first amount of data for the first content from the first storage device prior to the first amount of data being requested by one or more client devices; and
   retrieving the second amount of data for the second content from the second storage device prior to the second amount of data being requested by the one or more client devices.

3. The method of claim 1 further comprising:
   determining that data of the first content is written to non-sequential storage blocks of the first storage device; and
   wherein prefetching the first amount of data comprises:
   performing an out-of-order retrieval of the first amount of data by reading at least first data and third data of the first content before reading second data of the first content.

4. The method of claim 1 further comprising:
   determining that the first content comprises first data, second data, and third data in order;
   determining that the first data and the third data are written to consecutive storage blocks of the first storage device, and that the second data is written to a storage block of the first storage device that is at least two storage blocks away from the consecutive storage blocks; and
   wherein prefetching the first amount of data comprises:
   defining a first read operation for the first data, a second read operation for the second data, and a third read operation for the third data;
   coalescing the first read operation with the third read operation into a coalesced read operation based on the first data and the third data being written to the consecutive storage blocks; and
   retrieving the first data and the third data before the second data in response to issuing the coalesced read operation.

5. The method of claim 1, wherein prefetching the first amount of data comprises:
   performing an out-of-order retrieval of the first amount of data using a first set of operations instead of a sequential retrieval of the first amount of data with a second set of operations, wherein the first set of operations comprises fewer operations than the second set of operations, and wherein the first set of operations is completed in less time by the first storage device than the second set of operations.

6. The method of claim 1 further comprising:
determining utilization of the cache;
increasing the first amount of data to prefetch in response to the utilization of the cache being less than a threshold; and
decreasing the first amount of data to prefetch in response to the utilization of the cache being greater than the threshold.

7. The method of claim 1, wherein determining the first measure of performance and the second measure of performance comprises:
measuring a third rate at which the first storage device returns the first set of data in response to the first set of requests; and
measuring a fourth second rate at which the second storage device returns the second set of data in response to the second set of requests.

8. The method of claim 1 further comprising:
tracking a non-sequential set of storage blocks of the first storage device that contain data of the first content;
determining that the first set of requests retrieve data from a first subset of the non-sequential set of storage blocks; and
selecting to prefetch a second subset of the non-sequential set of storage blocks that store data equal to the first amount of data.

9. The method of claim 8, wherein prefetching the first amount of data comprises:
retrieving the first amount of data by directly referencing the second subset of storage blocks and without referencing a name of the first content or associated files of the first content.

10. The method of claim 1 further comprising:
selecting the first amount of data of the first content to prefetch based on the first amount of data being written to the first storage device at a same time as the first set of data and in response to a same set of write requests being issued by a client device.

11. The method of claim 1, wherein receiving the first set of requests comprises:
intercepting a first set of read operations issued by a file system to the first storage device;
determining that the first set of data is not stored in the cache; and
forwarding the first set of read operations to the first storage device.

12. The method of claim 11 further comprising:
intercepting a second set of read operations issued by the file system to the first storage device after said prefetching;
determining that the second set of read operations request the first amount of data that is prefetched from the first storage device; and
responding to the second set of read operations by providing the first amount of data from the cache.

13. The method of claim 1 further comprising:
receiving a third set of requests to read a second set of data of the first content after said prefetching;
determining that the second set of data corresponds to the first amount of data that is prefetched from the first storage device; and
responding to the third set of requests by providing the first amount of data from the cache.

14. The method of claim 1, wherein said prefetching comprises:
caching a second set of data of the first content that is less than a third set of data of the second content in response to the first measure of performance and the second measure of performance indicating that the first storage device reads more data in a same amount of time as the second storage device.

15. A device comprising:
a cache; and
one or more processors configured to:
receive a first set of requests at a first rate to read a first set of data of first content from a first storage device in a storage system, and a second set of requests at a different second rate to read a first set of data of second content from a second storage device in the storage system;
determine a first measure of performance for the first storage device that is different than a second measure of performance for the second storage device;
prioritize an allocation of the cache based on a first difference between the first rate and the second rate, and a second difference between the first measure of performance and the second measure of performance; and
prefetch a first amount of data for the first content from the first storage device and a different second amount of data for the second content from the second storage device to the cache based on the first difference and the second difference.

16. The device of claim 15, wherein the one or more processors are further configured to:
determine that data of the first content is written to non-sequential storage blocks of the first storage device; and
wherein prefetching the first amount of data comprises:
performing an out-of-order retrieval of the first amount of data by reading at least a first data and third data of the first content before reading second data of the first content that comes immediately after the first data in the first content.

17. The device of claim 15, wherein the one or more processors are further configured to:
determine that the first content comprises first data, second data, and third data in order;
determine that the first data and the third data are written to consecutive storage blocks of the first storage device, and that the second data is written to a storage block of the first storage device that is at least two storage blocks away from the consecutive storage blocks; and
wherein prefetching the first amount of data comprises:
defining a first read operation for the first data, a second read operation for the second data, and a third read operation for the third data;
coalescing the first read operation with the third read operation into a coalesced read operation based on the first data and the third data being written to the consecutive storage blocks; and
retrieving the first data and the third data before the second data in response to issuing the coalesced read operation.

18. The device of claim 15, wherein the one or more processors are further configured to:
determine utilization of the cache;
increase the first amount of data to prefetch in response to the utilization of the cache being less than a threshold; and
decrease the first amount of data to prefetch in response to the utilization of the cache being greater than the threshold.

19. The device of claim 15, wherein the one or more processors are further configured to:
- track a non-sequential set of storage blocks of the first storage device that contain data of the first content;
- determine that the first set of requests retrieve data from a first subset of the non-sequential set of storage blocks; and
- select to prefetch a second subset of the non-sequential set of storage blocks that store data equal to the first amount of data.

20. A multi-client storage system comprising:
- a first storage device reading and writing data at a first rate;
- a second storage device reading and writing data at a second rate;
- a file system issuing a first set of requests at a third rate to read a first set of data of first content from the first storage device, and a second set of requests at a different fourth rate to read a first set of data of second content from the second storage device; and
- a controller comprising a cache and a plurality of processor-executable instructions to:
  - prioritize an allocation of the cache based on a first difference between the first rate and the second rate, and a second difference between the third rate and the fourth rate; and
  - prefetch a first amount of data for the first content from the first storage device and a different second amount of data for the second content from the second storage device to the cache based on the first difference and the second difference.

* * * * *